United States Patent [19]

Sundholm

[11] Patent Number: 4,538,835
[45] Date of Patent: Sep. 3, 1985

[54] CONNECTION FOR JOINING A PIPE HAVING A FLARED END TO A FIXED CONNECTION PIECE, SUCH AS A PUMP

[76] Inventor: Göran Sundholm, Metsontie 1 A 12, 04320 Riihikallio, Finland

[21] Appl. No.: 397,294

[22] Filed: Jul. 12, 1982

[30] Foreign Application Priority Data

Dec. 7, 1981 [FI] Finland .................. 813920

[51] Int. Cl.³ .................. F16L 25/00
[52] U.S. Cl. .................. 285/12; 285/158; 285/175; 285/332.3; 285/349
[58] Field of Search .......... 285/159, 158, 177, 334.5, 285/334.1, 349, 175, 332.3, 12

[56] References Cited

U.S. PATENT DOCUMENTS

| | | | |
|---|---|---|---|
| 2,568,232 | 9/1951 | Hamer | 285/349 X |
| 3,243,209 | 3/1966 | Chertok | 285/349 X |
| 3,273,918 | 9/1966 | Legarra et al. | 285/334.5 X |
| 3,759,552 | 9/1973 | Levinsohn | 285/175 |
| 4,225,161 | 9/1980 | Smith | 285/159 |
| 4,252,346 | 2/1981 | Sundholm | 285/158 |

Primary Examiner—Dave W. Arola
Attorney, Agent, or Firm—Ladas & Parry

[57] ABSTRACT

The invention relates to a connection for joining a pipe provided with a flared end to a fixed connection piece. The connection comprises a conventional joint piece for flared connections having an insert piece screwed on the end facing the fixed connection piece for abutment against the fixed connection piece and against an end cone of the joint piece. A portion of the surface of the insert piece abutting against the fixed connection piece is arranged to extend some distance forwards before the mounting so that this portion, when tightening a flange, will be deformed and pressed against the end cone of the joint piece in order to provide sealing.

4 Claims, 5 Drawing Figures

CONNECTION FOR JOINING A PIPE HAVING A FLARED END TO A FIXED CONNECTION PIECE, SUCH AS A PUMP

The present invention relates to a connection for joining a pipe having a flared end to a fixed connection piece, for example, a pump.

In hydraulic connections so-called flared connections are commonly used, the end of the pipe to be joined is expanded to form a conical flare or collar which is placed to abut against a corresponding conical end surface of a joint piece. The joint piece is provided with an outer end thread on to which a clamping nut is screwed to engage, with a shoulder, the flare at the pipe end, often through an intermediate ring. Fixed connection pieces, such as pumps and valves, are in general designed for a different type of connection employing clamping flanges and are provided with fixed threaded bores for clamping bolts. In order to be able to connect pipes with flared ends to such fixed connection pieces it has hitherto been necessary to use specially made joint pieces, at one end designed for a flared joint and at the other end for a flange joint. Such specially made joint pieces are relatively expensive.

The object of the present invention is to provide a new and simpler solution for said purpose.

The connection according to the invention is mainly characterized in that it comprises a conventional joint piece for flared connections provided at each end with an outer thread and a conical end surface intended to be received by a flared pipe end, and an insert piece screwed on the end of the joint piece facing the fixed connection piece for abutment, on one hand, against the end cone of the joint piece and, on the other hand, preferably while sealing, against the end surface of the fixed connection piece, said insert piece being provided with a shoulder for a clamping flange and with an inner end portion which extends some distance in front of the end surface of the shoulder towards the fixed connection piece and joins the body of the insert piece through an intermediate portion, so that when the clamping flange is tightened against the fixed connection piece, said inner end portion of the insert piece will be forced against the joint piece until the shoulder of the insert piece will abut against the fixed connection.

Thus, the invention eliminates the need of specially made joint pieces, the insert piece included in the invention is inexpensive and can be used in combination with all types of existing joint pieces for flared connections, such as straight joint pieces, curved and branched joint pieces.

In the following, the invention will be described in more detail with reference to the accompanying drawing.

Figure 1:
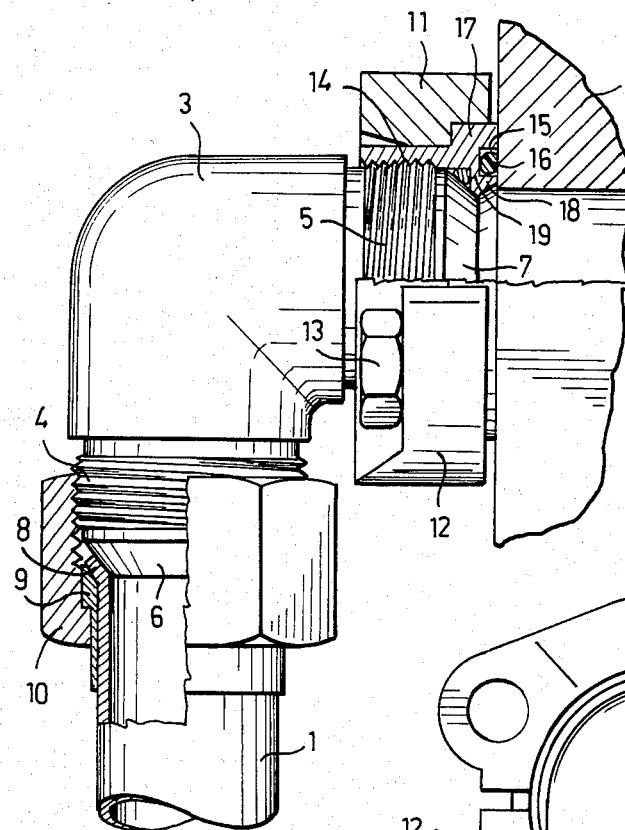
FIG. 1 is a side view, partly in section, of a connection in assembled condition.

FIG. 1 shows a pipe 1 having an end flare 8, connected to a fixed connection piece 2, for example, a pump. In the connection use is made of a joint piece 3 conventionally designed for flared connections, in FIG. 1 a so-called L-piece with outer threads 4 and 5 at each end and conical end surfaces 6 and 7. The flare 8 of the pipe abuts against the conical surface 6 and is kept in place by means of a clamping nut 10 screwed onto the threah 4, the shoulder of the nut 10 acting on the flare 8 through an intermediate ring 9.

Figure 2:
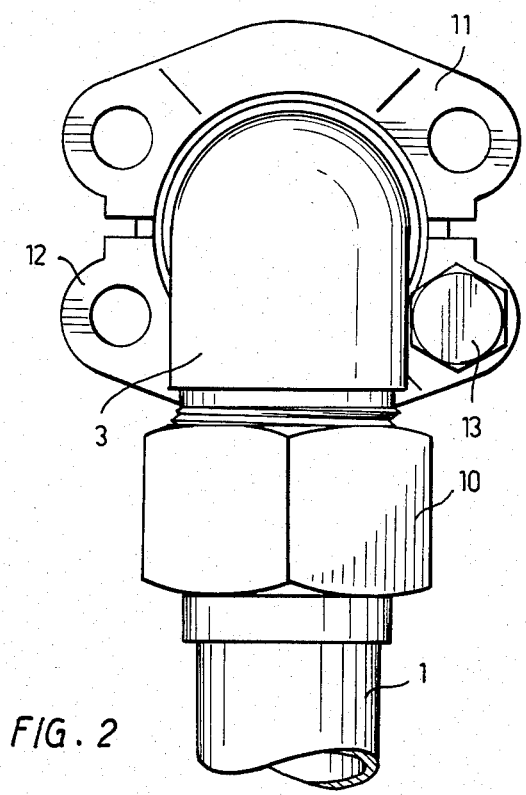
FIG. 2 is a view against the plane of the fixed connection piece.

For the connection of the fixed connection piece 2 use is made of two flange halves 11 and 12 which, of cource, also can be replaced with a continuous encircling flange. The fixed connection piece 2 is provided with threaded bores for clamping bolts 13, of which only one is shown in the FIGS. 1 and 2. In order to provide abutment for the flange halves 11 and 12, an insert piece 14 is screwed on the end thread 5 of the joint piece 3, said insert piece being provided with a shoulder 17 for the flanges 11 and 12 and an annular groove 15 for a sealing ring 16 in its front end surface. The insert piece 14 is also provided with an abutment surface against the end cone 7 of the joint piece 3. Said abutment surface will be discussed more closely hereinafter.

The insert piece 14 is annular in order to permit adjustment with respect to the flanges 11 and 12 and, accordingly, to permit alignment in relation to the pipe 1. Because the outer surface of the insert piece 14 is circular, the insert piece is screwed by hand on the thread 5 due to which no firm tightening is achieved and leakage may occur along the conical surface 7 and the thread 5. In order to avoid such leakage, the inner radially portion 18 of the insert piece is arranged to extend a short distance a in front of the end surface of the shoulder 17, and the protruding portion 18 is connected to the body of the insert piece through a relatively narrow intermediate portion 19. When the clamping bolts 13 are tightened, the entire abutment force will first be concentrated on the projecting ring portion 18 which hereby will be forced backwards, i.e. will be bent at the intermediate portion 19 and will firmly abut against the end cone 7 of the joint piece while thereby providing the required sealing. The deformation ceases as soon as the shoulder 17 of the insert piece abuts against the fixed connection piece 2. In practice, the deformation in question is quite small, the distance a may be, for example, about 0.1 to 0.3 mm. The deformation is also elastic so that the connection can be disconnected and remounted.

Figure 3:
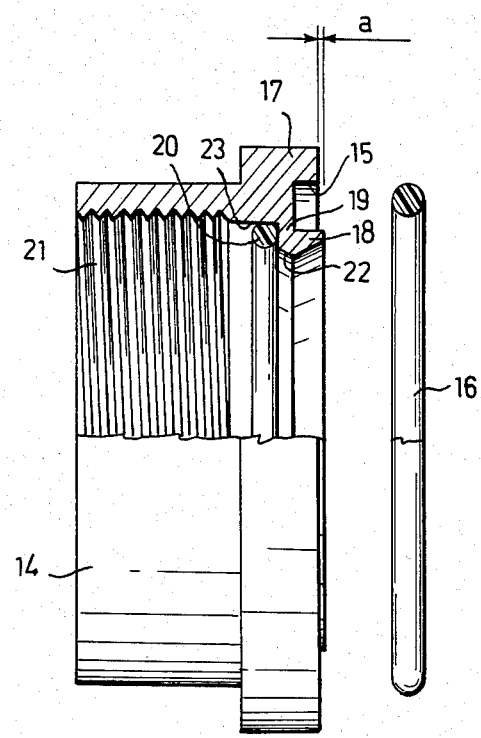
FIGS. 3 to 5 illustrate alternative embodiments of the insert piece included in the connection according to the invention.
Figure 4:
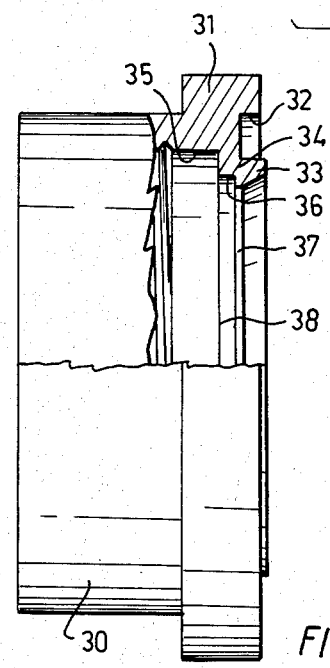
Figure 5:
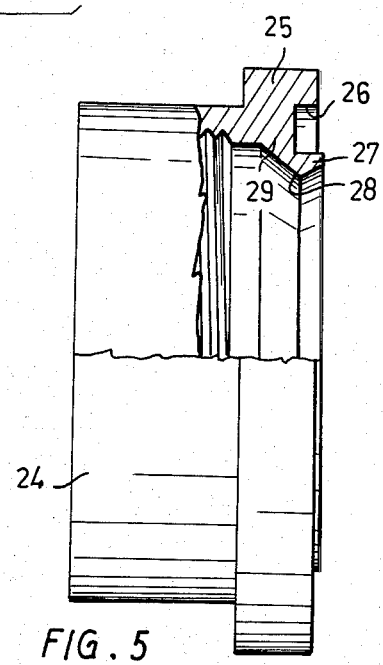

FIG. 3 illustrates the insert piece 14 according to FIG. 1 separately before mounting. It is provided with an inner thread 21 corresponding to the thread 5 of the joint piece, and the abutment surface against the end cone 7 of the joint piece is provided with a part 22 adapted to the cone 7 and a recess 23 which is located behind said part 22 and in which preferably a sealing ring 20 can be inserted. In the embodiment according to FIG. 4, the insert piece 30 is provided with two recesses 35 and 36 stepped one after the other so as to produce sharp edges 37 and 38. The edges 37 and 38 to some extent cut into the end cone 7 of the joint piece, which in most cases as such provides a sufficient sealing. Of course, if desired, additional sealing rings can be inserted in the recesses 35 and 36. In many cases, especially if the inner pressure is not particularly high, a sufficient sealing is achieved also by means of the embodiment according to FIG. 5 where the joint piece 34 is provided only with a conical abutment surface 38. It should be pointed out here that the sealing action is not produced only by the portions 18, 27 and 33, respectively, abutting against the end cone 7 of the joint piece 3; as said portions are pressed in at the intermediate portions 19, 29 and 34, the entire joint piece 3 will be pressed backwards so that also the threads 5 and 21 will abut tightly against each other.

What I claim is:

1. A connection for joining a pipe having a flared end to a fixed connection piece comprising, a conventional joint piece for flared connections provided at each end with an outer thread and a conical end surface intended to be received by a flared pipe end, and an insert piece screwed onto the end of the joint piece facing the fixed connection piece for abutment against the end cone of the joint piece and against the end surface of the fixed connection piece, said insert piece being provided with a shoulder for engagement with a clamping flange by tightening of the clamping flange against the fixed connection piece by means of tightening means and a radially inner end portion which extends some distance in front of the end surface of the shoulder towards the fixed connection piece and is joined to the body of the insert piece through an intermediate portion, so that when the clamping flange is tightened against the fixed connection, said inner portion of the insert piece will engage the fixed connection piece and be driven to bite into the end cone of the joint piece until the shoulder of the insert piece abuts against the fixed connection piece.

2. A connection according to claim 1, characterized in that the abutment surface of the insert piece against the end cone of the joint piece is conical.

3. A connection according to claim 1, characterized in that the abutment surface of the insert piece against the end cone of the joint piece is provided with at least one annular recess for receiving a sealing ring.

4. A connection according to claim 3, characterized in that the annular recess is provided with a sharp edge for penetrating into the end cone of the joint piece.

* * * * *